United States Patent [19]

Giraud et al.

[11] Patent Number: 5,268,615
[45] Date of Patent: Dec. 7, 1993

[54] DEVICE FOR THE [SERVO-] CONTROL OF THE CUT-OFF VOLTAGE OF A CATHODE-RAY TUBE BY MEASUREMENT OF LUMINANCE

[75] Inventors: Andre Giraud, Toulouse; Henri Huillet, Merignac, both of France

[73] Assignee: Sextant Avionique, France

[21] Appl. No.: 933,220

[22] Filed: Aug. 21, 1992

[30] Foreign Application Priority Data

Aug. 30, 1991 [FR] France ........................ 91 10800

[51] Int. Cl.$^5$ .......................................... H01J 31/26
[52] U.S. Cl. .................................. 315/10; 358/69
[58] Field of Search ............. 315/10, 383; 358/69, 358/168, 169

[56] References Cited

U.S. PATENT DOCUMENTS

| | | |
|---|---|---|
| 2,556,455 | 6/1951 | Szegho et al. |
| 3,562,409 | 2/1971 | Freeman et al. ............ 358/69 |
| 3,715,617 | 2/1973 | Tilton et al. |
| 3,737,563 | 6/1973 | Ketelaar ...................... 358/69 |

FOREIGN PATENT DOCUMENTS 2100454 3/1972 France .
1552608 9/1979 United Kingdom .
1585063 2/1981 United Kingdom .

OTHER PUBLICATIONS

Patent Abstract of Japan, vol. 9, No. 150 (E-324) [1873], 25 Jun. 1985; & JP-A-60 29 091 (Aroka K.K.) 14 Feb. 1985.
Patent Abstract of Japan, vol. 8, No. 123 (E-249) [1560], 8 Jun. 1984; & JP-A-59 34 788 (Sony K.K.) 25 Feb. 1984.

Primary Examiner—Theodore M. Blum
Attorney, Agent, or Firm—Cushman, Darby & Cushman

[57] ABSTRACT

The disclosure relates to cathode-ray tubes that have to be used at a low level of luminance. A zone of the screen of the tube is covered with a luminophore of high sensitivity and is associated with a luminance sensor by an optic fiber that measures the luminance of the tube at chosen instants corresponding to an excitation of said luminophore by an electron beam deflected towards the part of the zone facing the fiber. The luminance signal is compared with a desired value and the result of the comparison is used to modify the cut-off voltage of the tube through action on the voltage of the cathode or of the Wehnelt gate of the tube. This device can be applied to cathode-ray tubes used in aircraft.

9 Claims, 3 Drawing Sheets

DEVICE FOR THE [SERVO-] CONTROL OF THE CUT-OFF VOLTAGE OF A CATHODE-RAY TUBE BY MEASUREMENT OF LUMINANCE

BACKGROUND OF THE INVENTION

1. Field of the Invention

The invention relates to cathode-ray tubes and, more particularly, to a device for the automatic modification of the cut-off voltage of a cathode-ray tube as a function of the luminance measured on the screen of the tube.

2. Description of the Prior Art

A cathode-ray tube 10 (FIG. 1) comprises in a chamber 11 under vacuum: a cathode 12 comprising a heated filament 16 that emits electrons and an anode 13 that is brought by means of a terminal 19 to a positive potential (HT) higher than the potential VK of the cathode so as to attract the electrons towards a surface 14 which constitutes the screen of the cathode-ray tube. The internal wall of the screen is coated with luminophores which get illuminated when they receive the electrons emitted by the cathode. This enables luminous images to be made to appear on the external wall of the screen by deflecting the path of the electrons, notably by means of variable magnetic fields created by deflection coils 15.

In order to achieve greater control over the path of the electrons and modulate the intensity of the electron beam, the electrons emitted by the cathode 12 go through a structure constituted by three electrodes or gates G1, G2 and G3 which are carried to potentials appropriate to their role. It is thus that the gate G1, better known as the Wehnelt gate, is positioned in the vicinity of the cathode and is at a negative potential VG1 with respect to this cathode so that it can stop or let through electrons going towards the screen. The gate G2, known as the acceleration electrode, is placed in the vicinity of the gate G1 towards the screen and is at a positive potential VG2 with respect to the cathode. Finally, the gate G3, known as the focusing gate, is placed before the deflection coils 15 and is at a positive potential VG3 with respect to the cathode.

In FIG. 1, the potentials of the different cathodes are obtained schematically by potentiometers 17, 18 and 101. The potentiometer 17 is connected between a terminal at +100 volts for example and a terminal connected to the ground. The potentiometer 18 is connected between the ground and a high voltage (HT) of 16 kilovolts for example. The potentiometer 101 is connected between the ground and a potential of −200 volts.

The cathode 12 is connected to the output terminal of the potentiometer 17 and its potential VK can therefore vary from 0 to +100 volts. The Wehnelt gate G1 is connected to the output terminal of the potentiometer 101 and its potential VG1 may therefore vary from 0 to −200 volts. The accelerator gate G2 is connected to a first output terminal of the potentiometer 18 and its potential VG2 may therefore vary from 0 to some thousands of volts. The focusing gate G2 is connected to a second output terminal of the potentiometer 18, and its potential VG3 may therefore reach several thousand volts.

It will be understood that the intensity of the electron beam and, hence, that of the luminous dot on the screen can be modulated by the modification of the voltage VGK1. To this effect, the gate G1 is biased at a voltage Vco, called a cut-off voltage, and a variable modulation voltage is applied to it to obtain a variable beam electron current and hence a variable luminance of the light dot on the screen.

The cut-off voltage Vco corresponds to the difference in potentials VKG1 which is just enough to prevent the passage of electrons towards the screen.

FIG. 2 is a graph showing the variation of the cathode current Ik which corresponds substantially to the luminance of the dot on the screen, as a function of the voltage VKG1 between the cathode and the gate G1. The curve 20, which is quasi-logarithmic, shows that the current Ik is zero for VKG1=Vco and that it reaches the value Iko for VKG1=0.

To obtain a linear characteristic between the signal applied to the gate G1 and the luminance on the screen, it is necessary, firstly, to linearize the curve 20 and, secondly, to hold the cathode-ray tube at its cut-off voltage in the absence of a modulation signal. This holding is all the more critical as the tube operates at low values of luminance, which it does when the cathode-ray tube is used in a dim environment.

To guarantee the stability of the low-level luminance, it is necessary:

always to bias the tube at its cut-off voltage;

to keep the voltage VKG2 stable between the cathode and the accelerator gate;

to keep the cathode heating power stable, i.e. ensure a certain precision and stability of the voltage Vf which is applied to the heating filament 16;

to keep the difference in potentials VKA between the cathode and the anode stable.

To solve these problems, it has been proposed to bias the tube with voltages VKG2, Vf and VKA that are as constant as possible, but it is difficult to maintain these voltages with a precision higher than 1%.

Furthermore, the characteristics of the tube, notably the cut-off voltage, change:

during the thermo-mechanical stabilization of the electron gun, when starting the system and in the course of ageing during the life of the tube.

The result thereof is that the bias voltages would have to be readjusted in the course of time.

To compensate for these drifts, devices have been proposed for the servo-control of the cut-off voltage of the tube by the measurement of the cathode current. This servo-control is done at regular intervals, for example during the frame flyback or retrace of the image, and its value is memorized during the next frame.

The acquisition of the servo-control value is done in two steps:

a first step of applying, to the gate G1, a voltage greater than the cut-off voltage and of measuring the cathode leakage currents. The result of this measurement is subtracted from the measurement made in the second step and makes it possible to do away with the effects of the leakage currents;

a second step of applying, to the tube, a low modulation voltage of a known value and of servo-controlling the potential VKG1 so as to measure a cathode current Ik which is the sum of the leakage currents measured during the first step and of a constant current Iks corresponding to the value that would be generated by the desired value or set value of the modulation which is applied.

Such a method is satisfactory when the dynamic range of cathode current is between 10 micro-amperes and 2 milliamperes, which corresponds to servo-control currents Iks that are appropriate when the minimum light conditions are what are known as drawing room conditions as is the case with family television sets.

When the tube is placed in a very dim environment and/or when it is very sensitive (because of the high output of the luminophores), the servo-control should be done at cathode current values far lower than one microampere. This is difficult to achieve because of the values of the insulation resistance and of the inter-electrode parasitic capacitances.

Furthermore, this prior art method does not take account of the variation of the sensitivity of the luminophores, namely their light output, in the course of time.

Other devices have been proposed, using a photodetector placed before or optically coupled to a part of the screen that is not normally used. Because of the performance characteristics required of the screen, the single phosphor or luminophore that is used generally has a fairly lengthy response time of at least several milliseconds.

Consequently, if it is sought to obtain an electrical signal with an amplitude representing the luminance of the phosphor, it is necessary to maintain the test pulse for the same length of time.

For applications where it is acceptable to interrupt the display of the image temporarily to carry out the operation for the automatic correction of the cut-off voltage of the tube, the build-up time of the phosphor is not an inconvenient factor.

The particular feature of the invention is that it overcomes the problem of the build-up or raising time of the phosphor because any elimination, even a very occasional one, of a frame of the displayed image is considered to be inacceptable in many applications.

SUMMARY OF THE INVENTION

The object of the present invention, therefore, is to make a device for the servo-control of the cut-off voltage of a cathode-ray tube that enables operation at very low luminance while at the same time eliminating the problems related to the ageing of the cathode-ray tubes and to the temporal drifts of their characteristics.

The invention relates to a device for the servo-control of the cut-off voltage of a cathode-ray tube, the screen of which has at least one first operational zone of the tube used to make the images appear on the screen and one second zone positioned outside the first zone, said device comprising a luminance sensor that is positioned facing the second zone to measure the luminance of the associated surface of the second zone, scanning means to direct the electron beam, at certain chosen instants, towards said surface associated with the sensor and means to modify the cut-off voltage of the tube as a function of the value of the luminance measurement in relation to a desired value, wherein the luminophore covering the second zone has a build-up or raising time to 99% that is smaller, by at least one order of magnitude, than that of the luminophore covering the first zone.

Preferably, this build-up time to 99% is of the order of a few microseconds for the luminophore of the second zone whereas it is of the order of a few milliseconds for the luminophore of the first zone.

BRIEF DESCRIPTION OF THE DRAWINGS

Other objects, features and advantages of the present invention shall appear from the following description of a particular embodiment, made with reference to the appended drawings, of which.

MORE DETAILED DESCRIPTION

The invention consists in modifying the cathode current Ik as a function of the measurement of the luminance of a point of the screen located outside the part that is normally used; preferably, this point of the screen is made with a luminophore having particular characteristics that shall be defined hereinafter.

Figure 1:
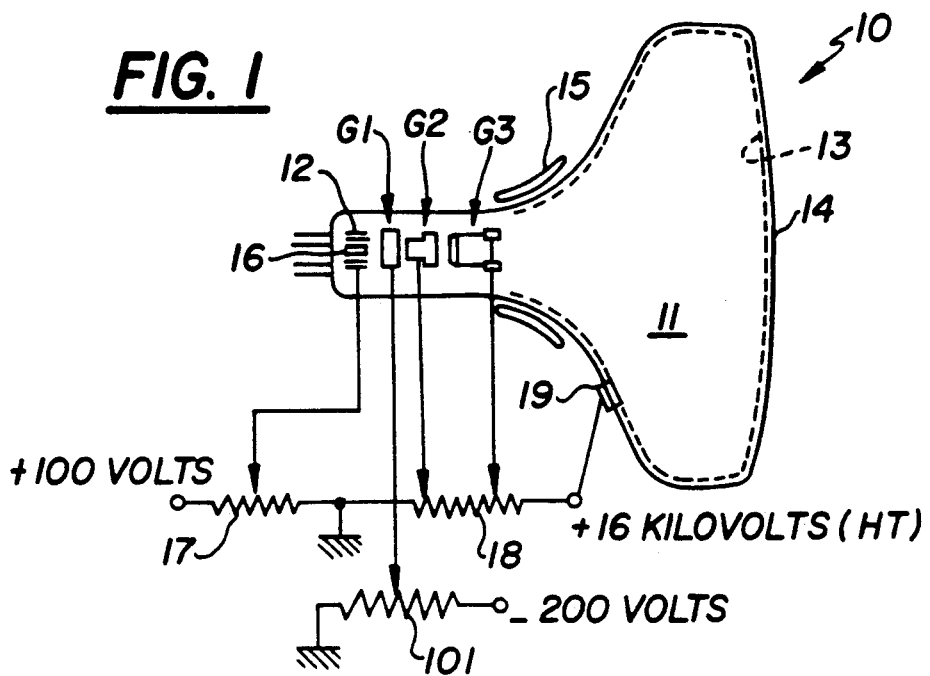
FIG. 1 is a diagram of a cathode-ray tube to which the present invention can be applied.
Figure 5:
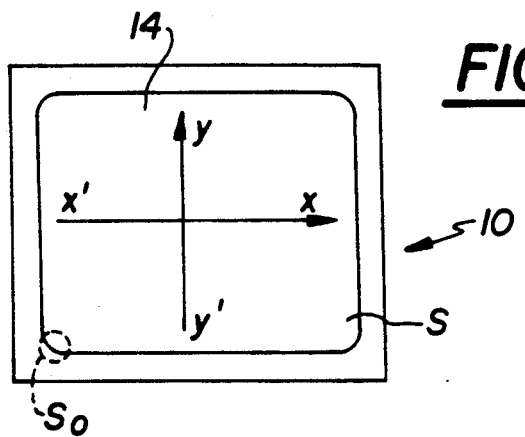
FIG. 5 is a front view of the screen 14 showing a possible position of the luminophore for the measurement of luminance according to the invention.
Figure 2:
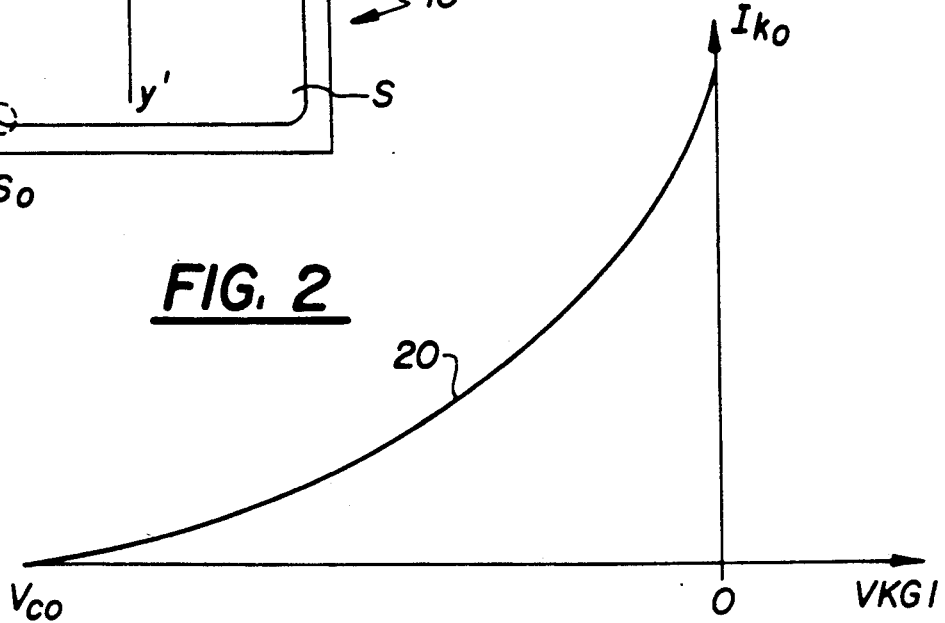
FIG. 2 is a graph showing the curve of variation of the cathode current of the tube as a function of the voltage applied to the Wehnelt gate.

To this effect, the screen 14 comprises (FIG. 5), in addition to a useful surface S made with the usual luminophores, a zone $S_o$ made with a luminophore Lo having features suited to its role in the device according to the invention. This zone $S_o$ is located at the periphery of the screen and is not normally scanned by the electron beam emitted by the cathode to make an operational image.

The luminophore Lo of the zone $S_o$ is chosen according to the following criteria:

its wavelength should be such that any visible parasitic radiation towards the operational surface of the tube is avoided; preferably, it will be in the infrared range;

its build-up time to 99% should be as short as possible so that the duration of the measurement phase of the luminance should be as short as possible; a build-up time of the order of a few microseconds is acceptable for a measurement during the frame flyback;

its energy yield should be as high as possible so as to servo-control the system as closely as possible to the cut-off voltage.

It will be noted that the build-up time to 99% of the luminophore of the operational zone S is generally of the order of a few milliseconds which must be compared with the build-up time of a few microseconds of the luminophore Lo of the zone $S_o$. It is recommended that the build-up time of the luminophore Lo be preferably far smaller than that of the luminophore of the zone S, smaller by at least by one order of magnitude (in a ratio of 10) to several orders of magnitude in the example described hereinabove (a ratio of 1000).

Figure 3:
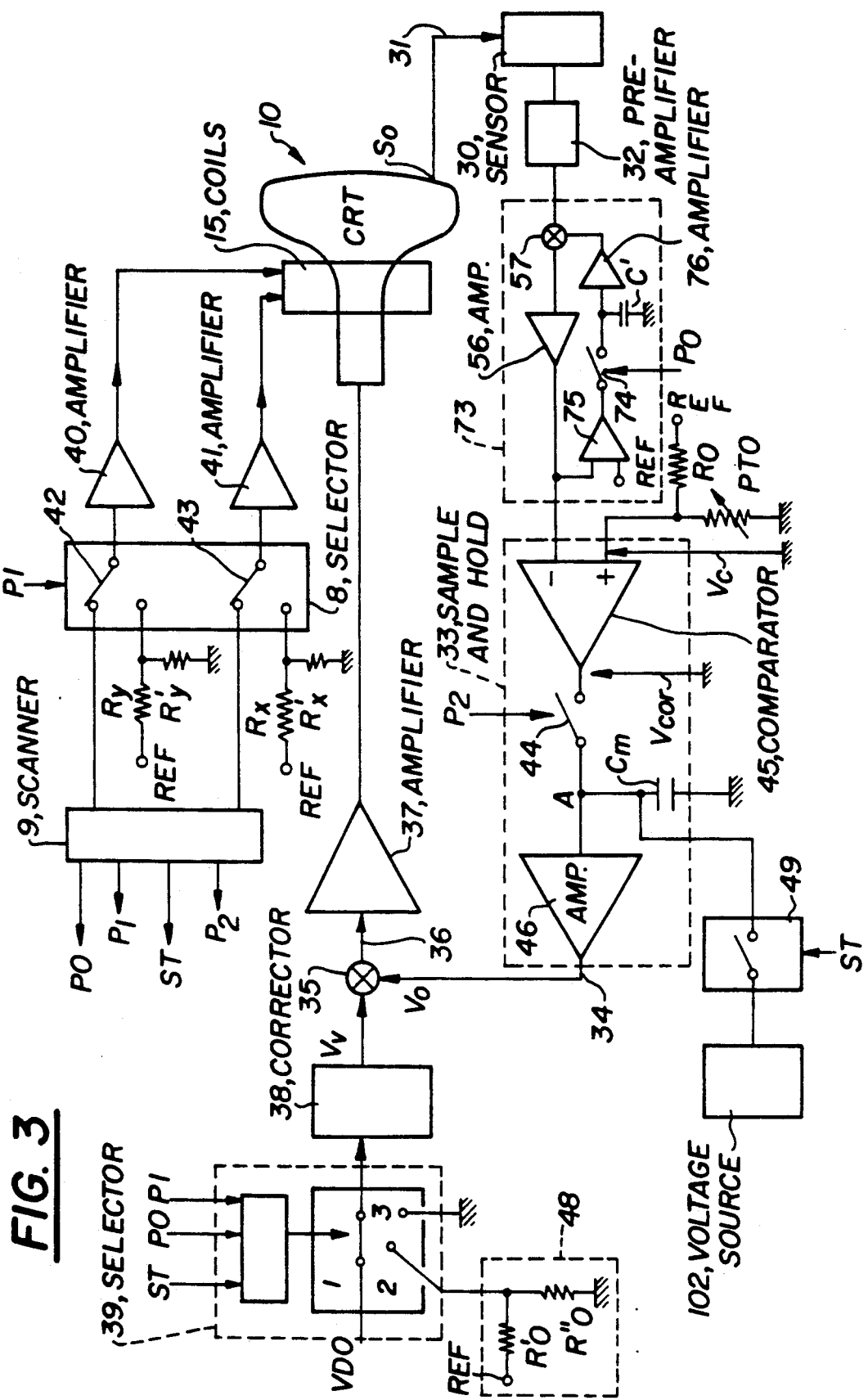
FIG. 3 is a functional diagram of a device for the automatic servo-control of the cut-off voltage of a cathode-ray tube according to the invention.

With this zone $S_o$, there is associated a photoelectric sensor 30, of the photoconductive diode or similar type, which gives an electrical signal representing the luminance of a dot of the zone $S_o$. Of course, the sensor 30 may be in the immediate vicinity of the zone $S_o$ or it may be at a distance therefrom and, in this case, may be connected to it by an optical fiber 31 as shown in FIG. 3.

The luminance sensor 30 should have the following characteristics:

its sensitivity should be the maximum for the wavelength of the luminophore Lo;

its surface area should be great enough to increase the energy received and facilitate its positioning;

its parasitic capacitance should be low enough for the passband of the detection system to allow the measurement to be done swiftly.

The electrical signal given by the sensor 30 is applied to a preamplifier 32, the output signal of which is applied to a circuit 73 which eliminates the component due to the dark current of the sensor 30 from the signal.

To this effect, the circuit 73 samples the value of the dark current during the phase P0 (FIG. 4a) and this sampled value is memorized for the rest of the time to be deduced from the signal coming from the preamplifier 32.

Figure 4A:
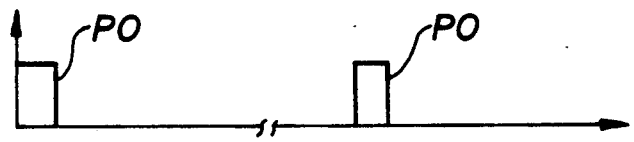
FIGS. 4a, 4b and 4c are graphs of signals used in the device of FIG. 3.

The circuit 73 may be designed in different ways and notably according to the diagram indicated within the rectangle 73. It includes an amplifier 56, the negative feedback loop of which is constituted by a sample-and-hold circuit and a subtractor circuit 57. The sample-and-hold circuit comprises a first amplifier 75, one input terminal of which is connected to the output terminal of the amplifier 56 and the other input terminal of which is connected to a reference voltage source REF. The output terminal of this first amplifier is connected to a terminal of a memory capacitor C' by means of a switch 74, the other terminal being connected to the ground. An amplifier 76 connects the capacitor C' to the subtractor circuit 57. The opening and closing of the switch 74 are activated by the phase signal P0 (FIG. 4a).

The output signal of the circuit 73 is applied to a sample-and-hold circuit 33 to be compared, in an error amplifier comparator 45, with a set value of luminance Vc that is adjusted by means of a resistive voltage divider connected between a voltage source REF and the ground and comprising a resistor RO and a potentiometer PTO. This sample-and-hold circuit comprises, mainly, the error amplifier comparator 45 which carries out this comparison and gives, at its output terminal, a correction voltage Vcor which, as shall be described further below, will enable the increasing or reducing of the cut-off voltage of the tube during the sampling phase P2 (FIG. 4c).

Through the closing of a switch 44 during this phase P2, this correction voltage Vcor is memorized in a capacitor Cm throughout the rest of the time when the switch 44 remains open.

The output stage of the sample-and-hold circuit 33 is constituted by an amplifier 46, the output terminal 34 of which is at a voltage $V_o$ which is equal to the charging voltage of the capacitor Cm at a point A (terminal A).

The voltage $V_o$ is subtracted from a voltage Vv corresponding to a video signal VDO in a subtractor circuit 35, the output terminal 36 of which is connected to the cathode of the cathode-ray tube 10 by means of an amplifier 37.

The video signal VDO is applied to the subtractor circuit 35 by means of a corrector circuit 38, better known as a gamma corrector circuit, which has the effect of linearizing the luminance of the screen as a function of the luminance control signal constituted by the video signal VDO.

Furthermore, according to the invention, the video signal is not applied permanently to the gamma corrector circuit owing to the interposition of a three-position selector 39 that enables the connection of the gamma corrector 38 and, consequently, of the subtractor circuit 35:

either to the video signal VDO in normal operation (position 1), or to the ground (position 3), or to a reference circuit 48 (position 2) during the servo-control phases.

This reference circuit 48 comprises a resistive voltage divider comprising resistors R'0 and R"0, the resistor R'0 being connected to the reference voltage REF and the resistor R"0 being connected to the ground.

The switching over of the selector 39 to the ground is obtained by the phase signal P0 (FIG. 4a) or by a signal ST when the cathode-ray tube is turned on.

Figure 4B:
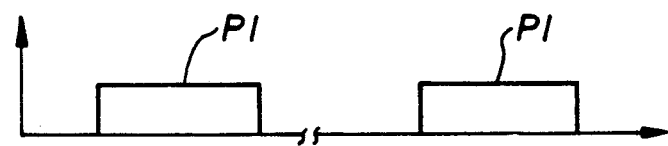
Figure 4C:
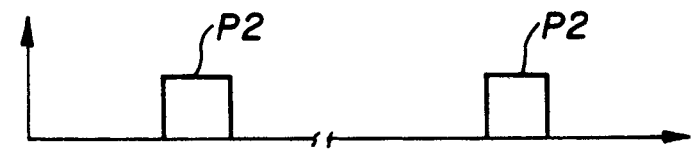

The switching over of the selector 39 towards the output terminal of the reference circuit 48 is obtained by a phase signal P1 (FIG. 4b). The phase signals P0 and P1 are cyclical and may be synchronized, for example, with the scanning signals. The signal P0 precedes the signal P1 without overlapping.

With the tube 10 and, more specially, with the deflection coils 15, deflection amplifiers are associated in a known way. One of these deflection amplifiers, referenced 40, is for the scanning along the x-axis X'X (FIG. 5) and the other one, referenced 41, is for the scanning along the y-axis Y'Y. These amplifiers 40 and 41 receive television or directed-beam type scanning signals from a scanning circuit 9 but, according to the invention, they also receive signals for the positioning of the electron beam for the duration of the phase signal P1 to direct said beam towards the zone $S_o$ of the screen and, more specifically, in front of the end of the optical fiber 31.

To this effect, the input terminal of each deflection amplifier 40 and 41 is respectively connected to a selector 42 and 43 of a selector circuit 8, activated by the signal P1, in such a way as to receive the scanning signals during the frame flyback or the directed-beam trace and to receive reference signals during the frame flyback or the time planned for the test during the directed-beam trace, i.e. in the duration of the signal P1. In FIG. 3, these reference signals are created by a resistive divider circuit supplied by a reference voltage REF and comprising the resistors Rx and R'x for the deflection along the axis X'X and the resistors Ry and R'y for the deflection along the axis Y'Y.

The luminance of the zone $S_o$ of the screen is measured by the sample-and-hold circuit 33 for a part of the duration of the signal P1. To this effect, the switch 44 of the sample-and-hold circuit 33 is controlled by a signal P2 (FIG. 4c) which appears during P1. As FIG. 3 shows, this signal P2 controls the charging of the capacitor Cm by means of the switch 44 positioned between the comparator 45 and the terminal A of the capacitor Cm, the other terminal of which is connected to the ground. The charging voltage of the capacitor Cm is applied to the subtractor 35 as described hereinabove.

Furthermore, the terminal A of the capacitor Cm is connected to a source 102 by a switch 49 activated by the signal ST so as to charge the capacitor Cm at a determined voltage when the tube 10 is turned on and so as to obtain maximum cut-off for the tube.

The signal ST as well as the signals P0, P1 and P2 are provided by the scanning circuit 9.

To obtain variation in the luminance threshold, the signal given by the sensor 30 is compared, as described hereinabove, with a set value Vc in the error amplifier 45; this set value is obtained by the resistive divider circuit that is connected between the reference voltage REF and the ground and comprises the resistor RO and the potentiometer PTO. This value Vc can be adjusted by the user to adapt the background luminance of the screen.

The tube then works as follows, assuming that the tube is in normal operation. Cyclically, for example at each frame flyback, the signal P0 switches over the selector 39 to the ground and enables the circuit 73 to sample the dark current of the sensor 30 while the beam current is almost zero and the beam is not positioned on the zone $S_o$, i.e. on the sensor 30. The circuit 73 will deduct this value from the servo-control measurement which shall be done subsequently.

Then, the signal P1 activates the selectors 42 and 43 so that the electron beam excites the point of the zone $S_o$ facing the end of the fiber 31. It also activates the selector 39 so that the subtractor 35 is connected, through the gamma corrector 38, to the reference voltage source 48 (position 2).

If the luminance, which is measured by the sensor 30, is greater than the set value Vc, the capacitor Cm gets discharged, for example during the signal P1, and the voltage of the point A diminishes; this has the effect, through the amplifier 46 and the subtractor 35, of diminishing the cathode current Ik and hence of increasing the difference in potentials VKG1, the effect of which is to diminish the electron current of the tube and hence the luminance of the tube.

It will be understood that the reverse effect is obtained when the luminance measured by the sensor 30 is smaller than the set value Vc.

When the voltage is turned on in the tube, it is important for the tube to be cut off to the maximum and the result thereof is that, according to the operation described hereinabove, the voltage at the point A should be the minimum: this is the role of the source 102 which may be zero or negative and which, when the voltage is turned on, is connected to the point A by the closing of the switch 49 through the signal ST.

For the same reason, the signal ST also activates the switch 39 to connect the gamma corrector 38 to the ground (position 3).

The invention has been described in providing for a measurement of luminance of the zone $S_o$ during the frame flyback but it is clear that other instants may be chosen depending on the applications of the servo-control device according to the invention.

What is claimed is:

1. A device for the servo-control of a cut-off voltage of a cathode-ray tube, said device comprising:
    a cathode-ray tube having a screen which has at least one first zone used to make images appear on the screen and at least one second zone positioned outside the at least one first zone;
    a luminescent material covering said at least one first zone;
    a luminescent material covering said at least one second zone;
    a luminance sensor facing the at least one second zone, luminance of the second zone being measured by said luminance sensor;
    scanning means to direct an electron beam of said cathode-ray tube, at certain chosen instants, towards said at least one second zone; and
    means to modify the cut-off voltage as a function of the luminance measurement in relation to a predetermined value;
    wherein the luminescent material covering the at least one second zone has a time response to achieve 99% of maximum luminescence that is shorter, by at least one order of magnitude, than that of the luminescent material covering the at least one first zone.

2. A device according to claim 1, wherein the time response to achieve 99% of maximum luminescence of the luminescent material covering the at least one second zone is of the order of one microsecond.

3. A device according to claim 1, wherein the luminescent material covering the at least one second zone has a wavelength that is different from that of the luminescent material covering the at least one first zone.

4. A device according to claim 1, wherein the luminescent material covering the at least one second zone has a wavelength in the invisible range.

5. A claim according to any one of claims 1 to 4, wherein said means to modify the cut-off voltage comprises:
    means for comparing the luminance measurement with said predetermined value;
    means for sampling, at chosen instants, an output of the comparison means; and
    means for providing, during the time interval between two chosen instants, a signal for the modification of the cut-off voltage;
    wherein the luminance measurement is maintained equal to the predetermined value.

6. A device according to claim 5, wherein the sampling means comprises a sample-and-hold circuit that is activated by a signal appearing at said chosen instants, said sample-and-hold circuit producing a sampling output signal which varies as a function of the result of the comparison;
    wherein said sampling output signal controls either a cathode or a Wehnelt gate of the cathode-ray tube.

7. A device according to any one of claims 1 to 4, wherein the luminance sensor comprises:
    an optical fiber, one end of which is positioned in front of the at least one second zone;
    a photoelectric cell connected to an opposite end of said optical fiber.

8. A device according to claim 5, wherein the luminance sensor comprises:
    an optical fiber, one end of which is positioned in front of said at least one second zone;
    a photoelectric cell connected to an opposite end of said optical fiber.

9. A device according to claim 6, wherein the luminance sensor comprises:
    an optical fiber, one end of which is positioned in front of the at least one second zone;
    a photoelectric cell connected to an opposite end of said optical fiber.

* * * * *